US009984226B2

(12) United States Patent
Sugaya

(10) Patent No.: US 9,984,226 B2
(45) Date of Patent: *May 29, 2018

(54) SCREEN SHARING SERVER, METHOD OF SHARING SCREEN, AND PROGRAM FOR SCREEN SHARING SERVER

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 129 days.

This patent is subject to a terminal disclaimer.

(21) Appl. No.: 15/000,098

(22) Filed: Jan. 19, 2016

(65) Prior Publication Data

US 2017/0109519 A1    Apr. 20, 2017

(30) Foreign Application Priority Data

Oct. 15, 2015  (JP) ................................ 2015-203346

(51) Int. Cl.
| H04L 29/06 | (2006.01) |
| G06F 21/44 | (2013.01) |
| G06F 3/0481 | (2013.01) |
| G06F 3/0484 | (2013.01) |
| G06F 3/14 | (2006.01) |

(Continued)

(52) U.S. Cl.
CPC ............ *G06F 21/44* (2013.01); *G06F 3/0481* (2013.01); *G06F 3/0484* (2013.01); *G06F 3/1423* (2013.01); *G06F 3/1454* (2013.01); *G06F 21/305* (2013.01); *G06F 21/445* (2013.01); *H04L 67/141* (2013.01); *H04L 67/42* (2013.01);

(Continued)

(58) Field of Classification Search
CPC ...... G06F 21/44; G06F 3/0481; G06F 3/0484; G06F 3/1423; G06F 4/1454; G06F 21/305; G06F 21/445; G06F 2221/2115; H04L 67/141; H04L 67/42; G09G 2370/022; G09G 2370/16

See application file for complete search history.

(56) References Cited

U.S. PATENT DOCUMENTS

| 2014/0086105 A1* | 3/2014 | Kang ...................... H04L 67/26 370/259 |
| 2014/0368410 A1* | 12/2014 | Imai ...................... G06F 3/1415 345/2.2 |
| 2015/0317123 A1* | 11/2015 | Wu ...................... H04L 65/1089 715/727 |

FOREIGN PATENT DOCUMENTS

JP    2001-256137    9/2001

* cited by examiner

*Primary Examiner* — Ghodrat Jamshidi
(74) *Attorney, Agent, or Firm* — Lex IP Meister, PLLC

(57) ABSTRACT

A screen sharing server receives a connection request each from a sender's user terminal and a receiver's user terminal, receives an authentication number to specify the sender's user terminal with which a screen is to be shared, in response to the connection request, allows the receiver's user terminal to display a prompt to ask for an input of the authentication number, authenticates the authentication number in response to receiving the authentication number from the receiver's user terminal, receives shared screen data from the sender's user terminal and sequentially transfers the shared screen data to the receiver's user terminal, if the authentication number is correct, detects that the sender's user terminal discontinues transmitting the screen data, and makes an inquiry to the receiver's user terminal with an authenticated authentication number about whether or not to transmit the shared screen data, in response to the detection.

12 Claims, 13 Drawing Sheets

(51) Int. Cl.
*H04L 29/08* (2006.01)
*G06F 21/30* (2013.01)

(52) U.S. Cl.
CPC ................ *G06F 2221/2115* (2013.01); *G09G 2370/022* (2013.01); *G09G 2370/16* (2013.01)

SCREEN SHARING SERVER, METHOD OF SHARING SCREEN, AND PROGRAM FOR SCREEN SHARING SERVER

CROSS REFERENCE TO RELATED APPLICATIONS

This application claims priority to Japanese Patent Application No. 2015-203346 filed on Oct. 15, 2015, the entire contents of which are incorporated by reference herein.

TECHNICAL FIELD

The present invention relates to a screen sharing server, a method of sharing a screen, and a program for a screen sharing server to allow user terminals to share a screen.

BACKGROUND ART

Recently, a public line network such as the Internet has allowed terminals to share a screen. In such screen sharing, a sender's terminal transmitting shared screen data is connected with a receiver's terminal receiving shared screen data through a screen sharing server. Then, the screen data of the sender's terminal is displayed on the receiver's terminal.

As disclosed in Patent Document 1, only specific IP addresses are permitted to access the screen sharing server, and then the users are authenticated, so as to allow only specific users to share a screen in such screen sharing.

CITATION LIST

Patent Literature

Patent Document 1: JP 2001-256137 A

SUMMARY OF INVENTION

However, the system of Patent Document 1 is less convenient because the IP address and the user of the receiver's terminal reattempting to perform screen sharing need to be authenticated again if the sender's terminal discontinues screen sharing.

An objective of the present invention is to provide a screen sharing server, a method of sharing a screen, and a program for a screen sharing server that improve the convenience by allowing a receiver's terminal to transmit shared screen data without ending screen sharing even if a sender's terminal discontinues screen sharing.

According to the first aspect of the present invention, a screen sharing server allowing user terminals to share a screen includes:

a connection request receiving unit that receives a connection request each from a sender's user terminal and a receiver's user terminal;

an authentication number receiving unit that receives an authentication number to specify the sender's user terminal with which a screen is to be shared, in response to the connection request;

an input receiving unit that allows the receiver's user terminal to display a prompt to ask for an input of the authentication number;

an authentication unit that authenticates the authentication number in response to receiving the authentication number from the receiver's user terminal;

a screen data transfer unit that receives shared screen data from the sender's user terminal and sequentially transfers the shared screen data to the receiver's user terminal, if the authentication number is correct;

a sharing discontinuation detection unit that detects that the sender's user terminal discontinues transmitting the screen data; and a transmission inquiry unit that makes an inquiry to the receiver's user terminal with an authenticated authentication number about whether or not to transmit the shared screen data, in response to the detection.

According to the first aspect of the present invention, a screen sharing server allowing user terminals to share a screen receives a connection request each from a sender's user terminal and a receiver's user terminal, receives an authentication number to specify the sender's user terminal with which a screen is to be shared, in response to the connection request, allows the receiver's user terminal to display a prompt to ask for an input of the authentication number, authenticates the authentication number in response to receiving the authentication number from the receiver's user terminal, receives shared screen data from the sender's user terminal and sequentially transfers the shared screen data to the receiver's user terminal, if the authentication number is correct, detects that the sender's user terminal discontinues transmitting the screen data, and makes an inquiry to the receiver's user terminal with an authenticated authentication number about whether or not to transmit the shared screen data, in response to the detection.

The first aspect of the present invention falls into the category of a screen sharing server, but the categories of a method of sharing a screen and a program for a screen sharing server have the same functions and effects.

According to the second aspect of the present invention, in the screen sharing server according to the first aspect of the present invention, the screen data transfer unit receives the shared screen data from the receiver's user terminal with an authenticated authentication number in response to the inquiry and sequentially transfers the shared screen data to a receiver's user terminal different from the receiver's user terminal at which the inquiry is made.

According to the second aspect of the present invention, the screen sharing server according to the first aspect of the present invention receives the shared screen data from the receiver's user terminal with an authenticated authentication number in response to the inquiry and sequentially transfers the shared screen data to a receiver's user terminal different from the receiver's user terminal at which the inquiry is made.

According to the third aspect of the present invention, the screen sharing server according to the first or the second aspect of the present invention further includes: an elapsed-time judging unit that judges whether or not a predetermined time has passed since the detection, in which the screen data transfer unit receives the shared screen data from a receiver's user terminal with an authenticated authentication number if the elapsed-time judging unit judges that a predetermined time has passed and sequentially transfers the shared screen data to a receiver's user terminal different from the receiver's user terminal at which the inquiry is made.

According to the third aspect of the present invention, the screen sharing server according to the first or the second aspect of the present invention judges whether or not a predetermined time has passed since the detection, receives the shared screen data from a receiver's user terminal with an authenticated authentication number if judging that a predetermined time has passed, and sequentially transfers the shared screen data to a receiver's user terminal different from the receiver's user terminal at which the inquiry is made.

According to the fourth aspect of the present invention, a method of sharing a screen by allowing user terminals to share a screen includes the steps of:

receiving a connection request each from a sender's user terminal and a receiver's user terminal;

receiving an authentication number to specify the sender's user terminal with which a screen is to be shared, in response to the connection request;

allowing the receiver's user terminal to display a prompt to ask for an input of the authentication number;

authenticating the authentication number in response to receiving the authentication number from the receiver's user terminal;

receiving shared screen data from the sender's user terminal and sequentially transferring the shared screen data to the receiver's user terminal, if the authentication number is correct;

detecting that the sender's user terminal discontinues transmitting the screen data; and making an inquiry to the receiver's user terminal with an authenticated authentication number about whether or not to transmit the shared screen data, in response to the detection.

According to the fifth aspect of the present invention, a computer program product for use in a screen sharing server allowing user terminals to share a screen includes a non-transitory computer usable medium having a set of instructions physically embodied therein, the set of instructions including computer readable program code, which when executed by the screen sharing server causes the information processing unit to:

receive a connection request each from a sender's user terminal and a receiver's user terminal;

receive an authentication number to specify the sender's user terminal with which a screen is to be shared, in response to the connection request;

allow the receiver's user terminal to display a prompt to ask for an input of the authentication number;

authenticate the authentication number in response to receiving the authentication number from the receiver's user terminal;

receive shared screen data from the sender's user terminal and sequentially transferring the shared screen data to the receiver's user terminal, if the authentication number is correct;

detect that the sender's user terminal discontinues transmitting the screen data; and make an inquiry to the receiver's user terminal with an authenticated authentication number about whether or not to transmit the shared screen data, in response to the detection.

The present invention can provide a screen sharing server, a method of sharing a screen, and a program for a screen sharing server that improve the convenience by allowing a receiver's terminal to transmit shared screen data without ending screen sharing even if a sender's terminal discontinues screen sharing.

DESCRIPTION OF EMBODIMENTS

Embodiments of the present invention will be described below with reference to the attached drawings. However, this is illustrative only, and the scope of the present invention is not limited thereto.

Overview of Screen Sharing System 1

Figure 1:
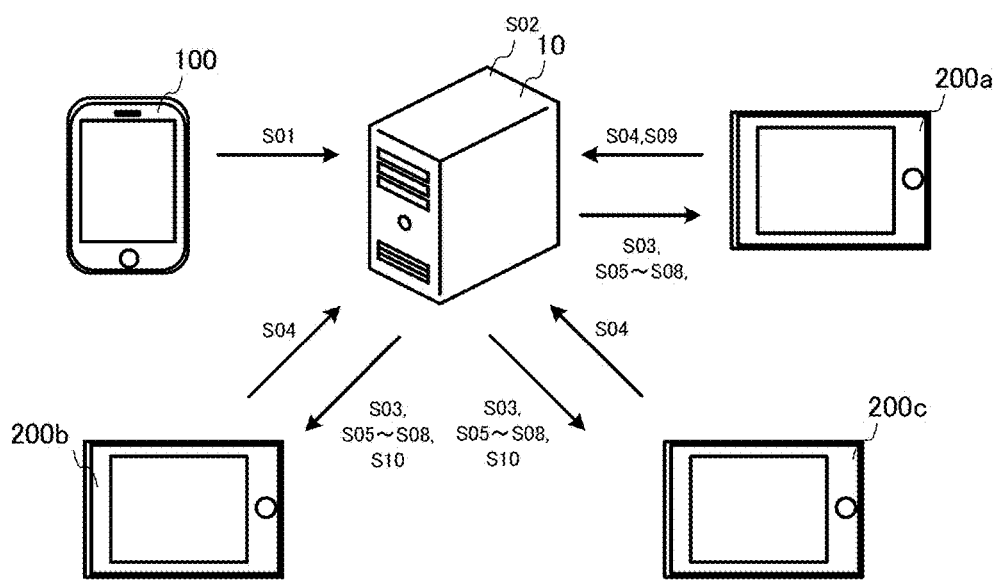
FIG. 1 is a schematic diagram of the screen sharing system 1.

The outline of the present invention will be described below with reference to FIG. 1. The screen sharing system 1 includes a screen sharing server 10, a sender's user terminal 100, a receiver's user terminal 200a, 200b, 200c (hereinafter merely referred to as "receiver's user terminal 200" unless otherwise specified).

The sender's user terminal 100 and the receiver's user terminal 200 start an application to perform screen sharing. The sender's user terminal 100 and the receiver's user terminal 200 transmit a connection request to the screen sharing server 10 (step S01).

The screen sharing server 10 issues an authentication number in response to the connection request received from the sender's user terminal 100 (step S02).

The screen sharing server 10 allows the receiver's user terminal 200 to display a prompt to ask for the authentication number issued in the step S02 (step S03). The receiver's user terminal 200 displays a prompt to ask for an input of the authentication number and receives an authentication number input from the user. The receiver's user terminal 200 transmits the received authentication number to the screen sharing server 10 (step S04).

The screen sharing server 10 receives the authentication number transmitted from the receiver's user terminal 200 and judges whether or not this authentication number is correct. Whether or not this authentication number is correct means whether or not the authentication number received this time is the same as that issued in the step S02. If judging that the authentication number received at this time is incorrect, the screen sharing server 10 does not transmit shared screen data to the receiver's user terminal 200 that transmits an incorrect authentication number. The screen sharing server 10 performs the alert generation process on the receiver's user terminal 200 that transmits an incorrect authentication number.

If the authentication number received from the receiver's user terminal 200 at this time is correct, the screen sharing server 10 counts the number of the receiver's user terminal that is currently connecting to the screen sharing server 10. If the counted number of the user terminal is a predetermined number or less, the screen sharing server 10 transmits a screen sharing start notification and then shared screen data to the receiver's user terminal 200 (step S05).

On the other hand, if the counted number of the terminal is more than a predetermined number, the screen sharing server 10 does not allow the receiver's user terminal 200 to share a screen. In this case, the screen sharing server 10 performs the alert generation process on the receiver's user terminal 200 that transmits a connection request.

The screen sharing server 10 judges whether or not the receiver's user terminal 200 is connected with the local area network with which the screen sharing server 10 is connected. At this time, the screen sharing server 10 acquires the IP address of the receiver's user terminal 200 and judges whether or not the receiver's user terminal 200 is connected with the local area network with which the screen sharing server 10 itself is connected. If judging that the receiver's user terminal 200 is connected with the local area network with which the screen sharing server 10 is connected, the screen sharing server 10 transmits a screen sharing start notification and then shared screen data to the receiver's user terminal 200 (step S06). On the other hand, if judging that the receiver's user terminal 200 is not connected with the local area network with which the screen sharing server 10 is connected, the screen sharing server 10 does not allow the receiver's user terminal 200 to share a screen. Then, the screen sharing server 10 performs the alert generation process on the receiver's user terminal 200 not connected with the local area network with which the screen sharing server 10 is connected.

The screen sharing server 10 judges whether or not a predetermined time has passed since the authentication number received from the receiver's user terminal 200 was issued in the step S02. If judging that a predetermined time has not passed since the authentication number received from the receiver's user terminal 200 was issued, the screen sharing server 10 transmits a screen sharing start notification and then shared screen data to the receiver's user terminal 200 (step S07). On the other hand, if judging that a predetermined time has passed since the authentication number received from a receiver's user terminal 200 was issued, the screen sharing server 10 does not allow the receiver's user terminal 200 that transmits this authentication number, to share a screen. In this case, the screen sharing server 10 performs the alert generation process on the receiver's user terminal 200 that transmits an authentication number that was issued before a predetermined time.

Then, the screen sharing server 10 judges whether or not the screen sharing server 10 detects an instruction to discontinue transmitting shared screen data from the sender's user terminal 100. If judging that the screen sharing server 10 does not detect an instruction to discontinue transmitting shared screen data from the sender's user terminal 100, the screen sharing server 10 continues to perform screen sharing. On the other hand, if judging that the screen sharing server 10 detects an instruction to discontinue transmitting shared screen data from the sender's user terminal 100, the screen sharing server 10 authenticates the authentication number and makes an inquiry to the receiver's user terminal 200 to which the sender's user terminal 100 transmits shared screen data, about whether or not to transmit shared screen data, in response to the detection.

The receiver's user terminal 200 receives an input whether or not to transmit shared screen data from the user based on the inquiry from the screen sharing server 10. The receiver's user terminal 200 receives an input from the user and transmits its own screen data to the screen sharing server 10 as shared screen data (step S09). In other words, in the step S09, the receiver's user terminal 200 receiving the input and transmitting shared screen data functions as a sender's user terminal 100.

The screen sharing server 10 receives the shared screen data transmitted from the receiver's user terminal 200 and transmits the shared screen data to a receiver's user terminal 200 different from the receiver's user terminal 200 that transmits shared screen data (step S10).

Configuration of Screen Sharing System 1

Figure 2:
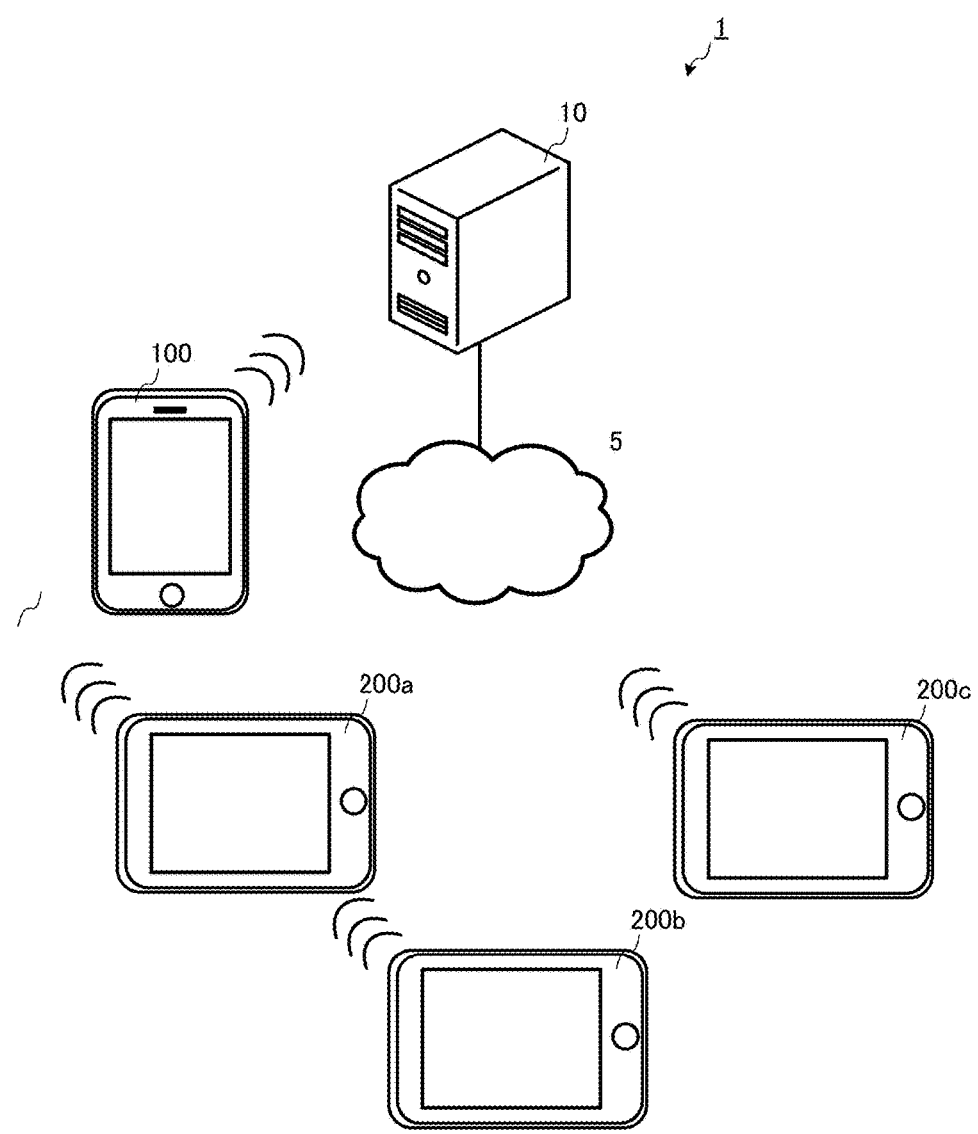
FIG. 2 is an overall schematic diagram of the screen sharing system 1.

FIG. 2 is a block diagram illustrating a screen sharing system 1 according to a preferable embodiment of the present invention. The screen sharing system 1 includes a screen sharing server 10, a sender's user terminal 100, a receiver's user terminal 200a, 200b, 200c (hereinafter merely referred to as "receiver's user terminal 200" unless otherwise specified), and a public line network 5 (e.g., the Internet network, a third and a fourth generation communication networks).

The sender's user terminal 100 is communicatively connected with the screen sharing server 10 through a public line network 5. Furthermore, the receiver's user terminal 200 is communicatively connected with the screen sharing server 10 through a public line network 5.

The sender's user terminal 100 may be a general information terminal capable of allowing a user to browse web pages, etc., and executing various applications. The sender's user terminal 100 is an information device or an electrical appliance with the functions to be described later. For example, the sender's user terminal 100 may be a mobile phone, a smart phone, a complex printer, a television, a network device such as a router or a gateway, and a computer. The sender's user terminal 100 may also be a white good such as a refrigerator or a washing machine. The sender's user terminal 100 may also be a general information appliance such as a telephone, a netbook terminal, a slate terminal, an electronic book terminal, an electronic dictionary terminal, a portable music player, and a portable content player and recorder.

In the same way as the sender's user terminal 100, the receiver's user terminal 200 may be a general information terminal capable of allowing a user to browse web pages, etc., and executing various applications. The receiver's user terminal 200 is an information device or an electrical appliance with the functions to be described later. For example, the receiver's user terminal 200 may be a mobile phone, a smart phone, a complex printer, a television, a network device such as a router or a gateway, and a computer. The receiver's user terminal 200 may also be a white good such as a refrigerator or a washing machine. The receiver's user terminal 200 may also be a general information appliance such as a telephone, a netbook terminal, a slate terminal, an electronic book terminal, an electronic dictionary terminal, a portable music player, and a portable content player and recorder.

The screen sharing server 10 issues an authentication number to be described later, performs the alert generation process, transmits the shared screen data transmitted from the sender's user terminal 100 to be described later to the receiver's user terminal 200, and also transmits the shared screen data transmitted from the receiver's user terminal 200 to be described later, to another receiver's user terminal 200.

Functions

Figure 3:
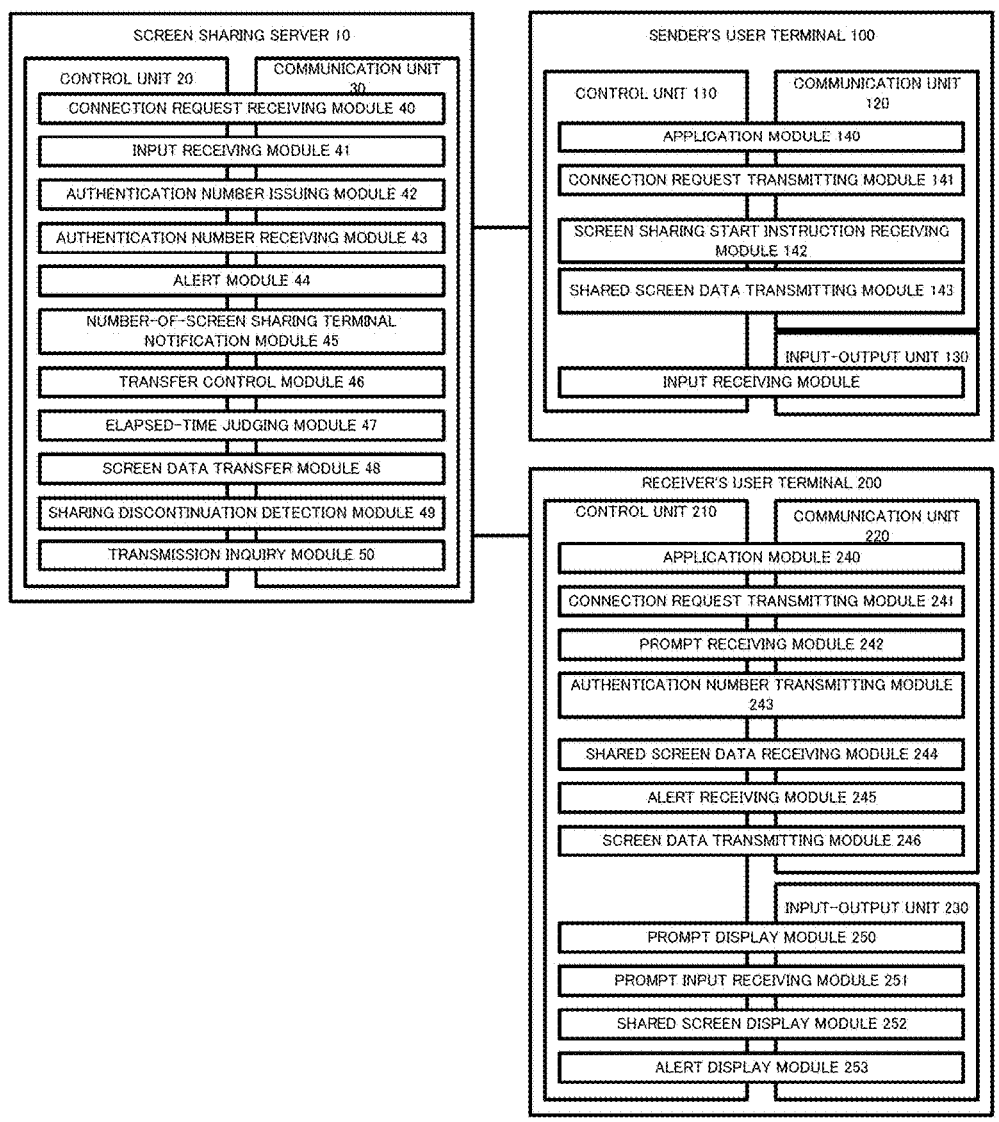
FIG. 3 is a functional block diagram of the screen sharing server 10, the sender's user terminal 100, and the receiver's user terminal 200.

FIG. 3 is a functional block diagram of the screen sharing server 10, the sender's user terminal 100, and the receiver's user terminal 200 to illustrate the relationship among their respective functions.

The screen sharing server 10 includes a control unit 20 including a central processing unit (hereinafter referred to as "CPU"), a random access memory (hereinafter referred to as "RAM"), and a read only memory (hereinafter referred to as "ROM"); and a communication unit 30 including a Wireless Fidelity or Wi-Fi® enabled device complying with, for example, IEEE 802.11, or a wireless device complying with the IMT-2000 standard such as the third generation mobile communication system. The communication unit may include a wired device for LAN connection.

In the screen sharing server 10, the control unit 20 reads a predetermined program to run a connection request receiving module 40, an input receiving module 41, an authentication number issuing module 42, an authentication number receiving module 43, an alert module 44, a number-of-screen sharing terminal notification module 45, a transfer control module 46, an elapsed-time judging module 47, a screen data transfer module 48, a sharing discontinuation detection module 49, and a transmission inquiry module 50 in cooperation with the communication unit 30.

The sender's user terminal 100 includes a control unit 110 including CPU, RAM, and ROM; and a communication unit 120 including a Wi-Fi® enabled device complying with, for example, IEEE 802.11, or a wireless device complying with the IMT-2000 standard such as the third generation mobile communication system. The communication unit may include a wired device for LAN connection.

The sender's user terminal 100 also includes a storage unit as a memory unit such as a hard disk or a semiconductor memory to store data. The user terminal 100 also includes an input-output unit 130 including a display unit outputting and displaying data and images that have been processed by the control unit1 120; and also including a touch panel, a keyboard, and a mouse that receive an input from a user.

In the sender's user terminal 100, the control unit 110 reads a predetermined program to run an application module 140, a connection request transmitting module 141, a screen sharing start instruction receiving module 142, and a shared screen data transmitting module 143 in cooperation with the communication unit 120. Still furthermore, in the sender's user terminal 100, the control unit 110 reads a predetermined program to run an input receiving module 150 in cooperation with the input-output unit 130.

The receiver's user terminal 200 includes a control unit 210 including CPU, RAM, and ROM; and a communication unit 220 including a Wi-Fi® enabled device complying with, for example, IEEE 802.11, or a wireless device complying with the IMT-2000 standard such as the third generation mobile communication system. The communication unit may include a wired device for LAN connection.

The receiver's user terminal 200 also includes a storage unit as a memory unit such as a hard disk or a semiconductor memory to store data. The receiver's user terminal 200 also includes an input-output unit 230 including a display unit outputting and displaying data and images that have been processed by the control unit 210; and also including a touch panel, a keyboard, and a mouse that receive an input from a user.

In the receiver's user terminal 200, the control unit 210 reads a predetermined program to run an application module 240, a connection request transmitting module 241, a prompt receiving module 242, an authentication number transmitting module 243, a shared screen data receiving module 244, an alert receiving module 245, and a screen data transmitting module 246 in cooperation with the communication unit 220. In the receiver's user terminal 200, the control unit 210 reads a predetermined program to run a prompt display module 250, a prompt input receiving module 251, a shared screen display module 252, and an alert display module 253 in cooperation with the input-output unit 230.

Screen Sharing Process

Figure 4:
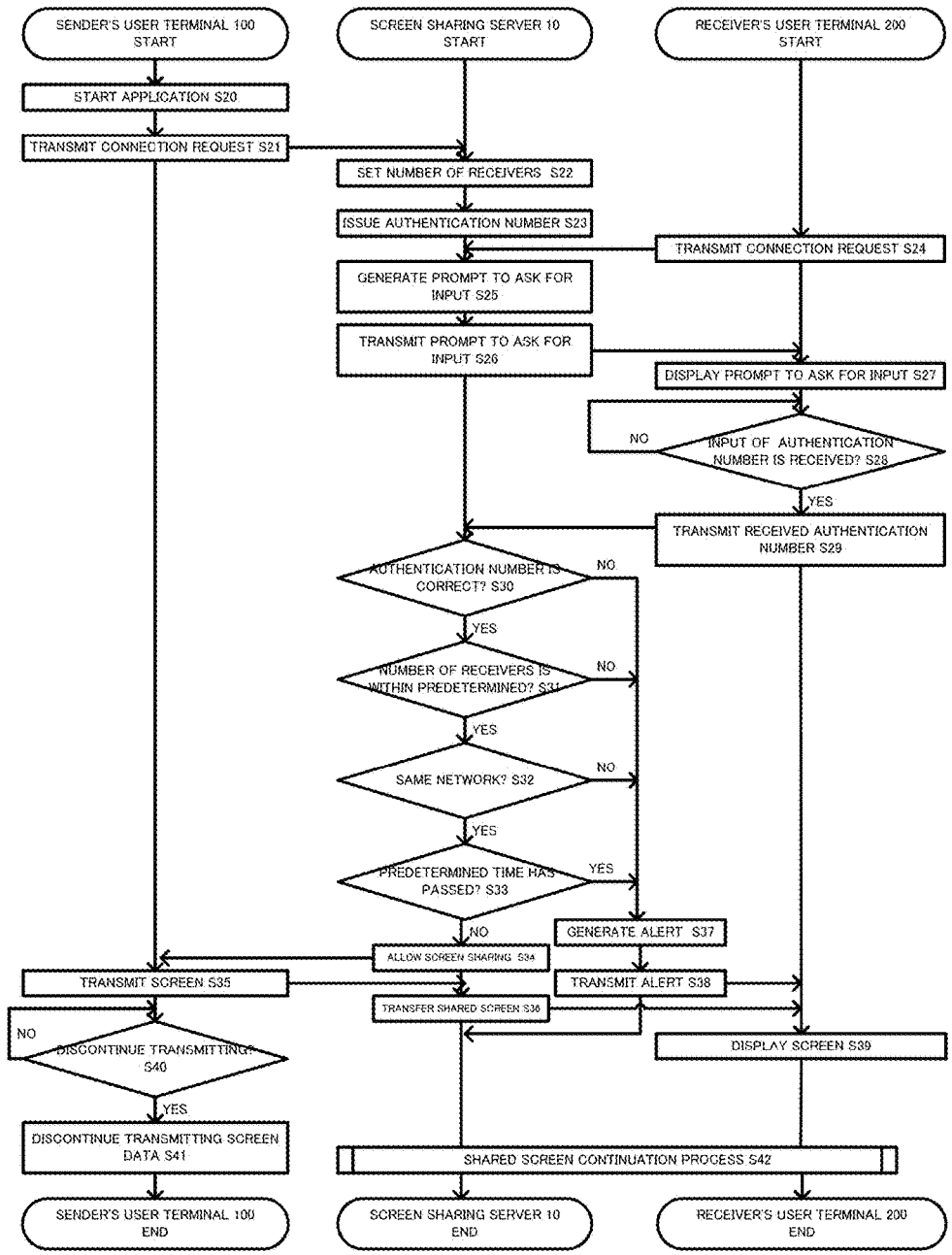
FIG. 4 is a flow chart of the screen sharing process executed by the screen sharing server 10, the sender's user terminal 100, and the receiver's user terminal 200.

FIG. 4 is a flow chart of the screen sharing process executed by the screen sharing server 10, the sender's user terminal 100, and the receiver's user terminal 200. The tasks executed by the modules of the above-mentioned devices are explained below together with this process. The number of the receiver's user terminals 200 may be one or may be two or more. Moreover, the receiver's user terminal 200 may be a sender's user terminal 100 and vice versa.

First, the application module 140 of the sender's user terminal 100 starts an application involved in screen sharing (step S20). The connection request transmitting module 141 of the sender's user terminal 100 transmits a connection request for performing screen sharing to the screen sharing server 10 (step S21).

The connection request receiving module 40 of the screen sharing server 10 receives the connection request transmitted from the sender's user terminal 100. The input receiving module 41 of the screen sharing server 10 sets the number of the receiver's user terminal 200 to be allowed to share a screen (step S22). In the step S22, the input receiving module 41 may not set the number of the receiver's user terminal 200. The number of the receiver's user terminal 200 may be set based on the previously set number of the terminal. The sender's user terminal 100 may insert the number of the receiver's user terminal 200 with which the sender's user terminal 100 shares a screen, in a connection request to be transmitted to the screen sharing server 10. The screen sharing server 10 may set the number of the receiver's user terminal 200 that is included in this connection request as the number of the receiver's user terminal 200 with which the sender's user terminal 100 shares a screen.

The authentication number issuing module 42 of the screen sharing server 10 issues an authentication number in response to the connection request transmitted from the sender's user terminal 100 (step S23). In the step S23, the authentication number that was issued by the authentication number issuing module 42 is a combination of numbers, characters, signs, etc. This embodiment will be explained below assuming that the authentication number issuing module 42 issues an authentication number of "12345." Needless to say, the authentication number that was issued by the authentication number issuing module 42 may be other than this authentication number.

The application module 240 of the receiver's user terminal 200 starts an application involved in screen sharing. The connection request transmitting module 241 of the receiver's user terminal 200 transmits a connection request for performing screen sharing to the screen sharing server 10 (step S24).

The connection request receiving module 40 of the screen sharing server 10 receives the connection request transmitted from the receiver's user terminal 200. The input receiving module 41 of the screen sharing server 10 generates a prompt to ask for an input of the authentication number (step S25). The input receiving module 41 transmits the generated prompt to the receiver's user terminal 200 (step S26).

Figure 6:
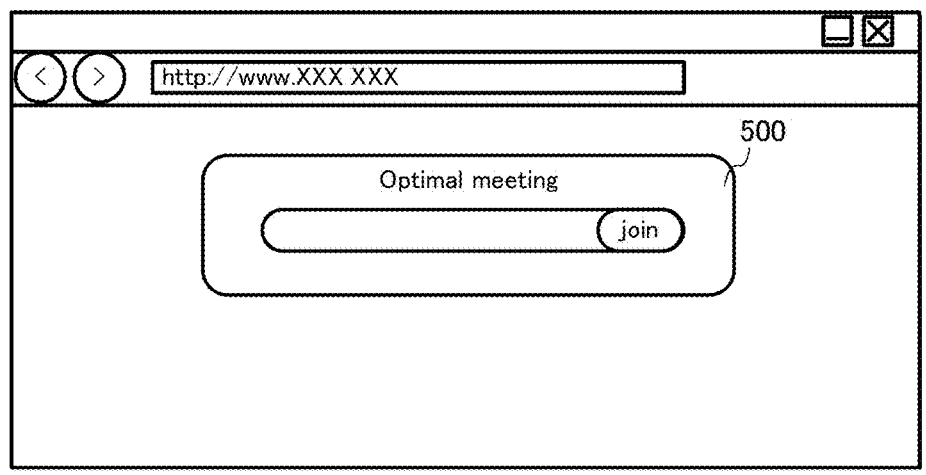
FIG. 6 shows a prompt asking for the authentication number, which is displayed on the receiver's user terminal 200.

The prompt receiving module 242 of the receiver's user terminal 200 receives the prompt transmitted from the input receiving module 41 of the screen sharing server 10. The prompt display module 250 of the receiver's user terminal 200 displays the received prompt (step S27). FIG. 6 shows the prompt 500 that the prompt display module 250 displays in the step S27. The prompt display module 250 displays the prompt 500 in the window of a network browsing application. The authentication number receiving module 251 of the receiver's user terminal 200 judges whether or not to receive an input of the authentication number from the user (step S28).

In the step S28, if judging that the receiver's user terminal 200 has not received an input of the authentication number (NO), the authentication number input receiving module 251 of the receiver's user terminal 200 repeats this step until receiving an input of the authentication number.

If the authentication number input receiving module 251 of the receiver's user terminal 200 judges that the receiver's user terminal 200 has received an input of the authentication number (YES) in the step S28, the authentication number transmitting module 243 transmits the received authentication number to the screen sharing server 10 (step S29).

The authentication number receiving module 43 of the screen sharing server 10 receives the authentication number transmitted from the receiver's user terminal 200. The input receiving module 41 of the screen sharing server 10 judges whether or not the received authentication number is correct (step S30). In the step S30, the input receiving module 41 judges whether or not the received authentication number is the same as the authentication number issued by the authentication number issuing module 42 of the screen sharing server 10 in the step S23. If the input receiving module 42 judges that the received authentication number is different from that issued by the authentication number issuing module 42 in the step S23, (NO) in the step S30, the alert module 44 of the screen sharing server 10 performs the alert generation process to be described later (step S37).

If the input receiving module 41 of the screen sharing server 10 judges that the authentication number received at this time is the same as that issued by the authentication number issuing module 42 of the screen sharing server 10 in the step S23 (YES), in the step S30, the number-of-screen sharing terminal notification module 45 of the screen sharing server 10 judges whether or not the number of the receiver's user terminal 200 currently performing screen sharing is a predetermined number or less (step S31). In the step S31, the number-of-screen sharing terminal notification module 45 counts the number of the receiver's user terminal 200 currently performing screen sharing and judges whether or not the number of the receiver's user terminal 200 that transmits the authentication number received by the input receiving module 41 of the screen sharing server 10 is a predetermined number or less.

If the number-of-screen sharing terminal notification module 45 of the screen sharing server 10 judges that the number of the receiver's user terminal 200 that is counted by the number-of-screen sharing terminal notification module 45 is more than a predetermined number (NO) in the step S31, the transfer control module 46 of the screen sharing server 10 does not transmit the screen data to this receiver's user terminal 200, and the alert generation process to be described later is executed (step S37). If the number-of-screen sharing terminal notification module 45 of the screen sharing server 10 judges that the number of the receiver's user terminal 200 that is counted by the number-of-screen sharing terminal notification module 45 itself is a predetermined number or less (YES) in the step S31, the transfer control module 46 judges whether or not the receiver's user terminal 200 is connected with the local area network with which the sender's user terminal 100 is connected (step S32).

In the step S32, the transfer control module 46 of the screen sharing server 10 acquires the IP address of the sender's user terminal 100 and then the IP address of the receiver's user terminal 200. The transfer control module 46 compares the network address of the IP address of the sender's user terminal 100 with that of the receiver's user terminal 200. If the network address of the IP address of the sender's user terminal 100 is different from that of the receiver's user terminal 200, the transfer control module 46 judges that the sender's user terminal 100 is not connected with the local area network with which the receiver's user terminal 200 is connected (NO) in the step S22, and then the alert module 44 of the screen sharing server 10 performs the alert generation process to be described later (step S37).

On the other hand, if the network address of the IP address of the sender's user terminal 100 is the same as that of the receiver's user terminal 200, the transfer control module 46 of the screen sharing server 10 judges that the sender's user terminal 100 is connected with the local area network with which the receiver's user terminal 100 is connected (YES) in the step S32, the elapsed-time judging module 47 of the screen sharing server 10 judges whether or not a predetermined time has passed since the authentication number transmitted from the receiver's user terminal 200 was issued in the step S23 (step S33)

In the step S32, the transfer control module 46 may judge whether or not to allow sharing screen data only between the sender's user terminal 100 and the receiver's user terminal 200 each with a previously specified IP address. In this case, the transfer control module 46 of the screen sharing server 10 only has to acquire the IP address of the receiver's user terminal 200 and judge whether or not the acquired IP address is the same as the previously specified IP address. If the IP address of the receiver's user terminal 200 is the same as the previously specified IP address, the transfer control module 46 only has to perform the step S33. If the IP address of the receiver's user terminal 200 is different from the previously specified IP address, the alert module 44 of the screen sharing server 10 only has to perform the alert generation process to be described later. The number of the previously specified IP address is not limited to one and may be two or more. Moreover, the previously specified IP address may be only a network address.

In the step S33, the elapsed-time judging module 47 of the screen sharing server 10 judges whether or not a predetermined time has passed since the authentication number was issued in the step S23. If the elapsed-time judging module 47 judges that a predetermined time has passed since the authentication number was issued in the step S23 (YES), in the step S33, the alert module 44 of the screen sharing server 10 performs the alert generation process to be described later (step S37)

On the other hand, if the elapsed-time judging module 47 of the screen sharing server 10 judges that a predetermined time has not passed since the authentication number was issued in the step S23, (NO) in the step S33, the screen data transfer module 48 of the screen sharing server 10 allows the terminals to start screen sharing (step S34). In the step S34, the screen data transfer module 48 transmits a screen sharing start notification to the sender's user terminal 100.

The screen sharing start notification receiving module 142 of the sender's user terminal 100 receives the screen sharing start notification transmitted from the screen sharing server 10. The shared screen data transmitting module 143 of the sender's user terminal 100 transmits its own screen data to the screen sharing server 10 as shared screen data (step S35).

The screen data transfer module 48 of the screen sharing server 10 receives the shared screen data transmitted from the sender's user terminal 100. The screen data transfer module 48 of the screen sharing server 10 sequentially transfers the received shared screen data to the receiver's user terminal 200 authenticated by an authentication number (step S36).

The screen data receiving module 244 of the receiver's user terminal 200 receives the screen data transmitted from the screen sharing server 10. The shared screen display module 252 of the receiver's user terminal 200 displays the received shared screen data as the shared screen shown in FIG. 7.

Figure 7:
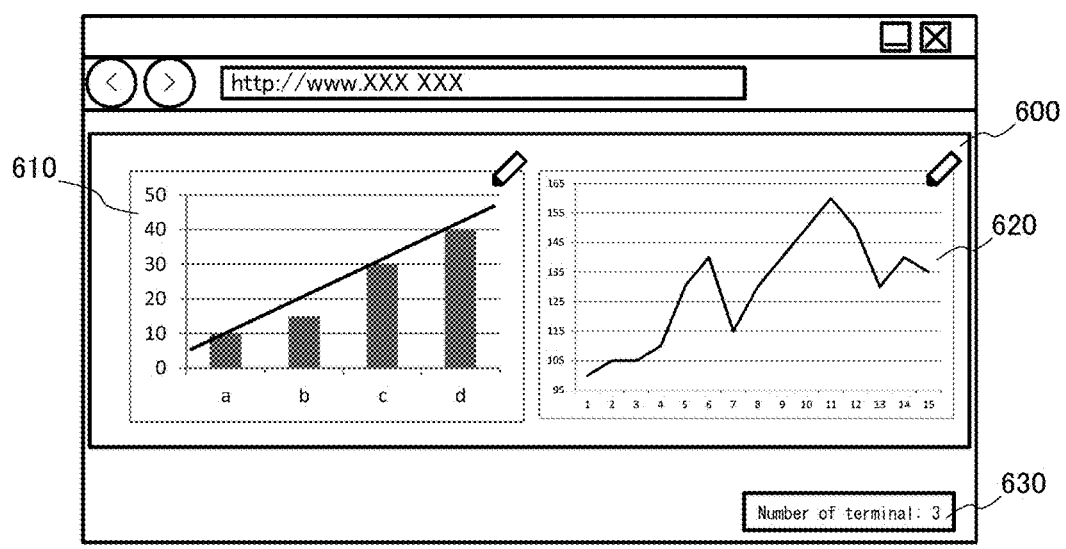
FIG. 7 shows a shared screen displayed on the receiver's user terminal 200.

FIG. 7 shows a shared screen displayed by the shared screen display module 252 of the receiver's user terminal 200. The shared screen display module 252 displays a window frame 600 and a number-of-screen sharing terminal display frame 630. The shared screen display module 252 displays the shared screen 610, 620 in the window frame 600. The shared screen display module 252 displays the number of the receiver's user terminal 200 currently performing screen sharing as the number of the screen-sharing terminal in the number-of-screen sharing terminal display frame 630. The number of shared screen displayed in the window frame 600 is not limited to two and may be one or more than two unlike this embodiment. The position, the form, and the content of the number-of-screen sharing terminal display frame 630 may be changed when appropriate.

The order of the steps S30 to S33 may be changed when appropriate.

Alert Generation Process

The alert generation process of the step S37 will be explained below.

Figure 8:
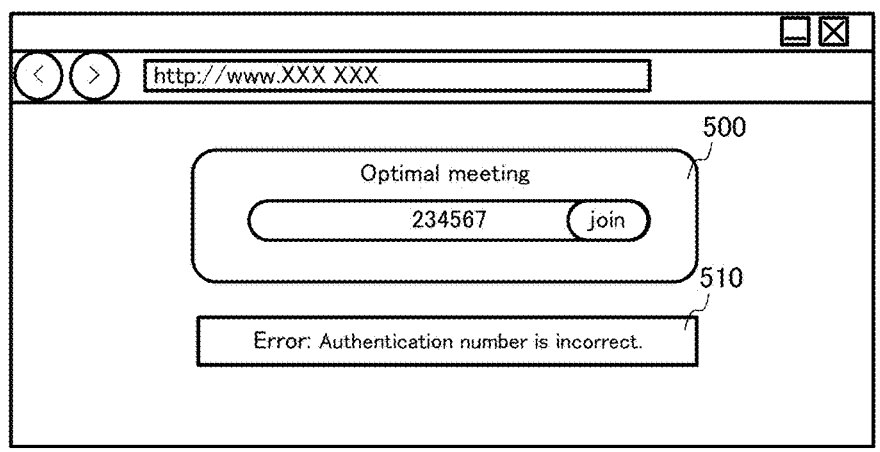
FIG. 8 shows an alert notification displayed on the receiver's user terminal 200.

If the input receiving module 41 of the screen sharing server 10 judges that the received authentication number is different from the authentication number issued by the authentication number issuing module 42 of the screen sharing server 10 in the step S23, (NO) in the step S30, the alert module 44 of the screen sharing server 10 generates an alert to warn of an incorrect authentication number (step S37). The alert module 44 transmits this alert to the receiver's user terminal 200 that transmits this authentication number (step S38). The alert receiving module 245 of the receiver's user terminal 200 receives the alert transmitted from the screen sharing server 10. The alert display module 253 of the receiver's user terminal 200 displays the received alert as an alert notification screen as shown in FIG. 8 (step S39). FIG. 8 shows an alert notification screen displayed by the alert display module 253. In FIG. 8, the alert display module 253 displays the notification in the alert frame 510 that the authentication number is incorrect.

Figure 9:
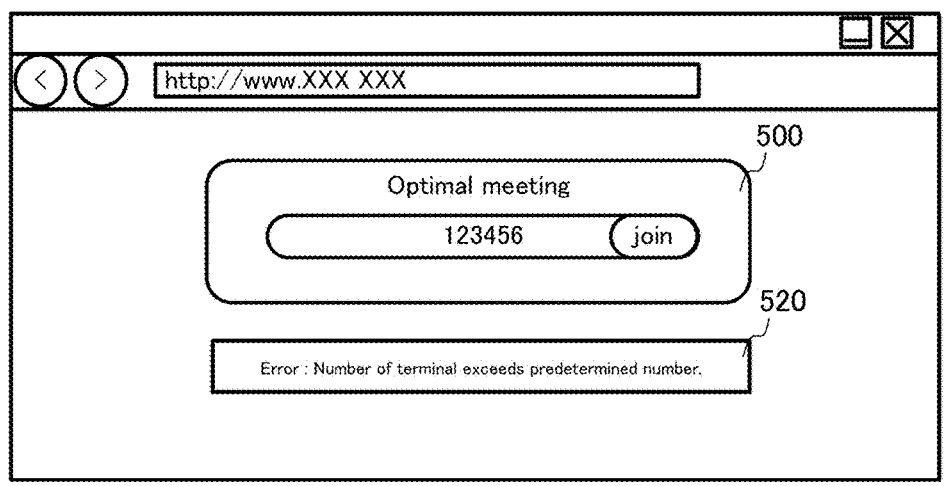
FIG. 9 shows an alert notification displayed on the receiver's user terminal 200.

If the transfer control module 46 of the screen sharing server 10 judges that the number of the receiver's user terminal 200 currently performing screen sharing counted by the number-of-screen sharing terminal notification module 45 of the screen sharing server 10 is more than a predetermined number (NO) in the step S31, the alert module 44 of the screen sharing server 10 generates an alert to warn of an excessive number of the receiver's user terminal 200 being connected (step S37). The alert module 44 transmits the generated alert to the receiver's user terminal 200 (step S38). The alert receiving module 245 of the receiver's user terminal 200 receives the alert transmitted from the screen sharing server 10. The alert display module 253 of the receiver's user terminal 200 displays the received alert as an alert notification screen as shown in FIG. 9 (step S39). FIG. 9 shows an alert notification screen displayed by the alert display module 253. In FIG. 9, the alert display module 253 displays the notification in the alert frame 520 that the number of the receiver's user terminal 200 performing screen sharing exceeds a predetermined number.

Figure 10:
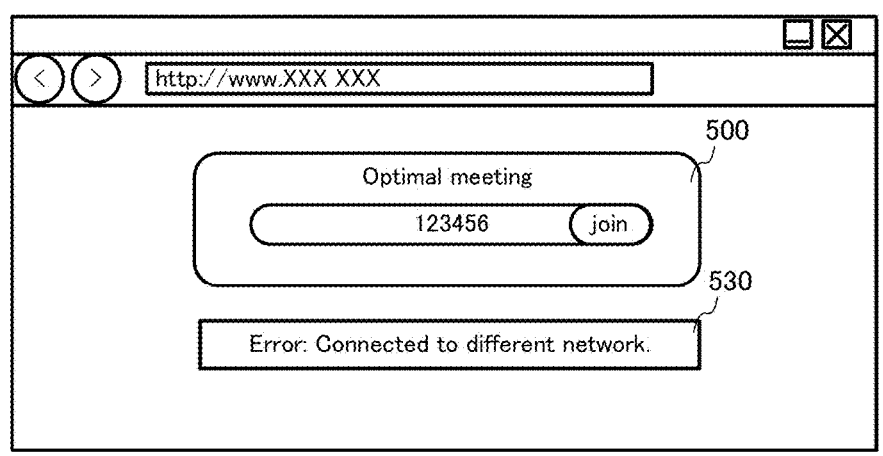
FIG. 10 shows an alert notification displayed on the receiver's user terminal 200.

If the transfer control module 46 of the screen sharing server 10 judges that the sender's user terminal 100 is not connected with the local area network with which the receiver's user terminal 200 is connected (NO) in the step S32, the alert module 44 of the screen sharing server 10 generates an alert to warn that the receiver's user terminal 200 is connected with a different local area network (step S37). The alert module 44 transmits the generated alert to the receiver's user terminal 200 (step S38). The alert receiving module 245 of the receiver's user terminal 200 receives the alert transmitted from the screen sharing server 10. The alert display module 253 of the receiver's user terminal 200 displays the received alert as an alert notification screen as shown in FIG. 10 (step S39). FIG. 10 shows an alert notification screen displayed by the alert display module 253. In FIG. 10, the alert display module 253 displays the notification in the alert frame 530 that the receiver's user terminal 200 is not connected with the local area network with which the sender's user terminal 100 is connected.

Figure 11:
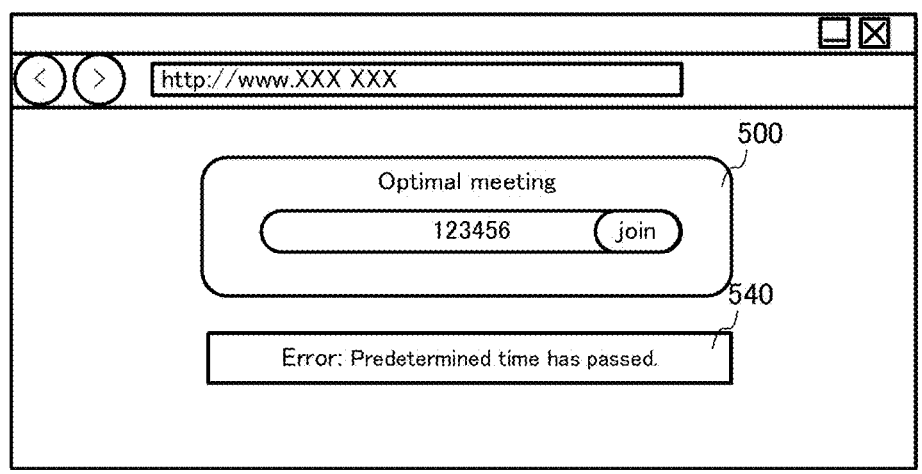
FIG. 11 shows an alert notification displayed on the receiver's user terminal 200.

If the elapsed-time judging module 47 of the screen sharing server 10 judges that a predetermined time has passed (YES) in the step S33, the alert module 44 of the screen sharing server 10 generates an alert to warn that a predetermined time has passed since the received authentication number was issued (step S37). The alert receiving module 245 of the receiver's user terminal 200 receives the alert transmitted from the screen sharing server 10. The alert display module 253 of the receiver's user terminal 200 displays the received alert as an alert notification screen as shown in FIG. 11 (step S39). FIG. 11 shows an alert notification screen displayed by the alert display module 253. In FIG. 11, the alert display module 253 displays the notification in the alert frame 540 that a predetermined time has passed.

Then, the input receiving module 150 of the sender's user terminal 100 judges whether or not the input receiving module 150 receives an input to discontinue transmitting screen data (step S40). In the step S40, the input receiving module 150 judges whether or not a user inputs a command to discontinue transmitting screen data by text, by voice, or by any other method.

In the step S40, if judging that the sender's user terminal 100 has not received an input to discontinue transmitting screen data (NO), the input receiving module 150 of the sender's user terminal 100 repeats this step until receiving an input.

On the other hand, if judging that the sender's user terminal 100 has received an input to discontinue transmitting screen data (YES) in the step S40, the shared screen data transmitting module 143 of the sender's user terminal 100 discontinues transmitting screen data (step S41).

The sharing discontinuation detection module 49 of the screen sharing server 10 detects that the sender's user terminal 100 is not transmitting screen data and performs the sharing continuation process (step S42). In the step S42, if detecting that screen data has not been received from the sender's user terminal 100 for a predetermined time, the sharing discontinuation detection module 49 detects that the sender's user terminal 100 is not transmitting screen data.

Sharing Continuation Process

Figure 5:
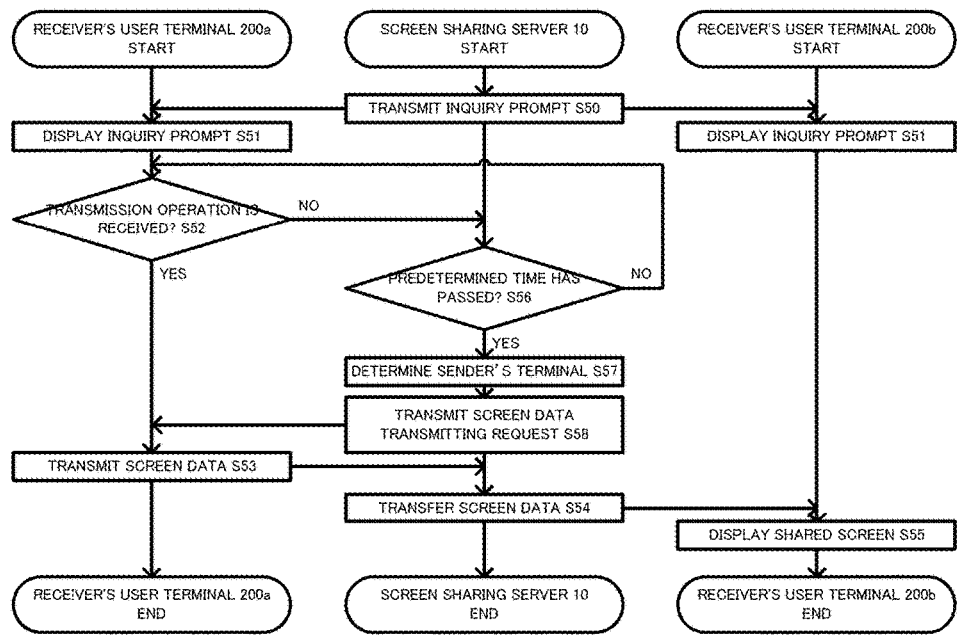
FIG. 5 is a flow chart of the sharing continuation process executed by the screen sharing server 10 and the receiver's user terminal 200.

FIG. 5 is a flow chart of the sharing continuation process executed by the screen sharing server 10 and the receiver's user terminal 200a, 200b. The tasks executed by the modules of the above-mentioned devices are explained below together with this process. The receiver's user terminal 200a, 200b may be another receiver's user terminal 200c.

When the sharing discontinuation detection module 49 of the screen sharing server 10 detects that the sender's user terminal 100 is not transmitting screen data, the transmission inquiry module 50 of the screen sharing server 10 transmits an inquiry prompt asking whether or not to transmit shared screen data to the receiver's user terminal 200a, 200b authenticated by an authentication number, which started to share a screen in the above-mentioned step S34 (step S50).

The prompt receiving module 242 of the receiver's user terminal 200a, 200b receives the inquiry prompt transmitted from the screen sharing server 10. The prompt display module 250 of the receiver's user terminal 200a, 200b displays the received inquiry prompt (step S51).

Figure 12:
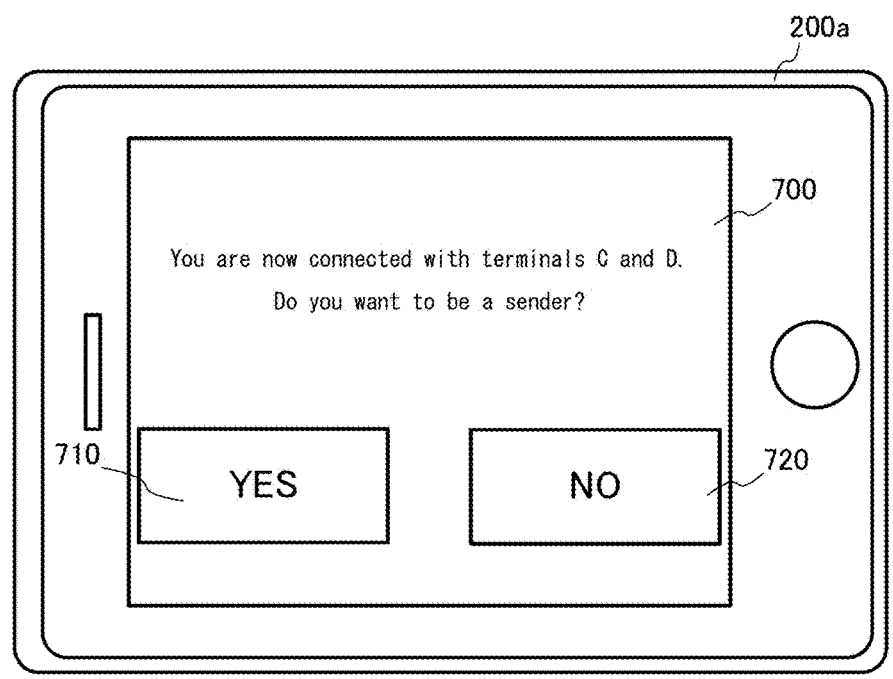
FIG. 12 shows a sharing continuation screen displayed on the receiver's user terminal 200.

FIG. 12 shows the inquiry prompt that the prompt display module 250 of the receiver's user terminal 200a displays. The prompt display module 250 of the receiver's user terminal 200a displays an inquiry prompt in the display window 700 together with the terminal name of a different receiver's user terminal 200 performing screen sharing and a message about whether or not the receiver's user terminal 200a itself becomes a sender of screen data. In FIG. 12, the prompt display module 250 of the receiver's user terminal 200a displays the message "You are now connected with the terminals C and D. Do you want to be a sender?" in the display window 700. The prompt display module 250 of the receiver's user terminal 200a also displays a transmission acceptance icon 710 and a transmission refusal icon 720. When a user taps the transmission acceptance icon 710, the prompt display module 250 of the receiver's user terminal 200a transmits its own screen data to the screen sharing server 10. When a user taps the transmission refusal icon 720, the prompt display module 250 of the receiver's user terminal 200a does not transmit its own screen data to the screen sharing server 10.

Figure 13:
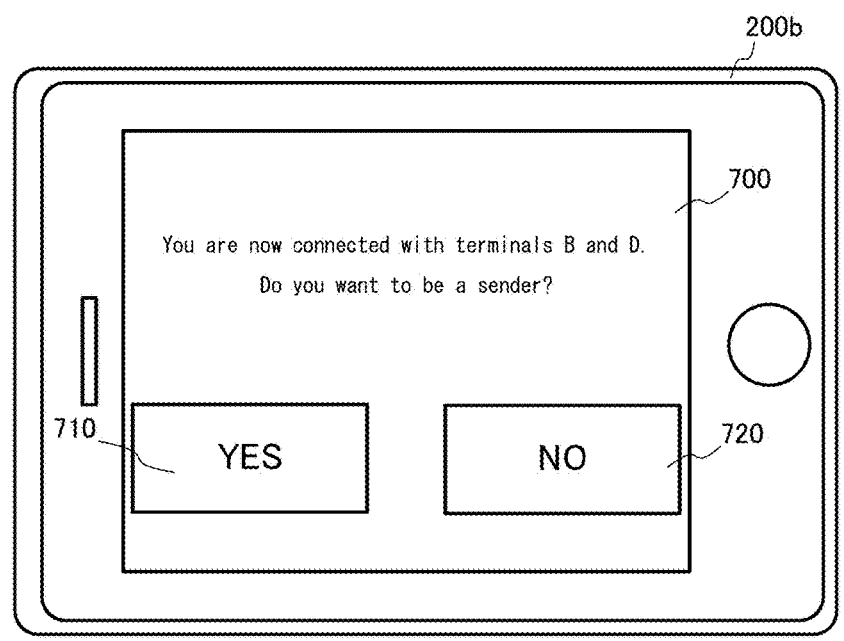
FIG. 13 shows a sharing continuation screen displayed on the receiver's user terminal 200.

FIG. 13 shows the inquiry prompt that the prompt display module 250 of the receiver's user terminal 200b displays. The prompt display module 250 of the receiver's user terminal 200b displays an inquiry prompt in the display window 700 including the terminal name of a different receiver's user terminal 200 performing screen sharing and a message about whether or not the receiver's user terminal 200b itself becomes a sender of screen data is displayed. In FIG. 13, the prompt display module 250 of the receiver's user terminal 200b displays the message "You are now connected with the terminals B and D. Do you want to be a sender?" in the display window 700. The prompt display module 250 of the receiver's user terminal 200b also displays a transmission acceptance icon 710 and a transmission refusal icon 720. When a user taps the transmission acceptance icon 710, the prompt display module 250 of the receiver's user terminal 200b transmits its own screen data to the screen sharing server 10. When a user taps the transmission refusal icon 720, the prompt display module 250 of the receiver's user terminal 200b does not transmit its own screen data to the screen sharing server 10.

The prompt display module 250 of the receiver's user terminal 200a judges whether or not the prompt display module 250 has received an operation input to transmit screen data to the screen sharing server 10 (step S52). In the step S52, if the prompt display module 250 of the receiver's user terminal 200a judges that the prompt display module 250 has received an operation input to transmit screen data to the screen sharing server 10 (YES), the screen data transmitting module 246 of the receiver's user terminal 200a transmits its own screen data to the screen sharing server 10 as shared screen data (step S53).

The screen data transfer module 48 of the screen sharing server 10 receives the shared screen data transmitted from the receiver's user terminal 200a. The screen data transfer module 48 sequentially transfers the shared screen data to the receiver's user terminal 200b (step S54). Specifically, in the sharing continuation process, the receiver's user terminal 200a performs the function in the same way as the above-mentioned sender's user terminal 100.

The screen data receiving module 244 of the receiver's user terminal 200b receives the screen data transmitted from the screen sharing server 10. The shared screen display module 252 of the receiver's user terminal 200b displays the received shared screen data (step S55).

On the other hand, if the prompt display module 250 of the receiver's user terminal 200a judges that the prompt display module 250 has not received an operation input to transmit screen data to the screen sharing server 10 (NO) in the step S52, the elapsed-time judging module 47 of the screen sharing server 10 judges whether or not a predetermined time has passed since the sharing discontinuation detection module 49 of the screen sharing server 10 detected that the sender's user terminal 100 was not transmitting screen data (step S56). If judging that a predetermined time has not passed (NO) in the step S56, the elapsed-time judging module 47 repeats the step S52. On the other hand, if the elapsed-time judging module 47 judges that a predetermined time has passed (YES) in the step S56, the screen data transfer module 48 of the screen sharing server 10 determines which to receive shared screen data from the receiver's user terminal 200a or 200b authenticated by an authentication number. This embodiment will be explained below assuming that the screen data transfer module 48 determines to receive shared screen data from the receiver's user terminal 200a.

The screen data transfer module 48 of the screen sharing server 10 transmits a screen data transmitting request to the receiver's user terminal 200a from which the screen data transfer module 48 determines to receive screen data in the step S57 (step S58).

The screen data transmitting module 246 of the receiver's user terminal 200a receives the screen data transmitting request transmitted from the screen sharing server 10 and transmits the screen data to the screen sharing server 10 as shared screen data (step S53). The screen data transmitting module 246 of the screen sharing server 10 receives the shared screen data transmitted from the receiver's user terminal 200a and sequentially transfers the shared screen data to a receiver's user terminal different from the receiver's user terminal 200a that has transmitted the received shared screen data (step S54). In the step S60, the screen data transfer module 48 may receive shared screen data from a terminal 200a, 200b whichever earlier or later authenticated by an authentication number. Alternatively, the screen data transfer module 48 may choose a receiver's user terminal 200 to receive shared screen data by another method.

Other Embodiments

In the embodiments described above, the transfer control module 46 of the screen sharing server 10 allows the terminals to share screen data after receiving a correct authentication number. When the sender's user terminal 100 can be connected with the receiver's user terminal 200 through short-range wireless communication by beacons, IR communication, Bluetooth®, etc., the screen sharing server 10 may allow the user terminals to share screen data. In this case, the sender's user terminal 100 and the receiver's user terminal 200 acquire a permission to start to share screen data through short-range wireless communication. The receiver's user terminal 200 transmits the acquired permission to the screen sharing server 10. The screen sharing server 10 transmits the screen data of the sender's user terminal 100 to the receiver's user terminal 200 from which the screen sharing server 10 has received the permission. The receiver's user terminal 200 receives the screen data transmitted from the screen sharing server 10. The receiver's user terminal 200 displays the received screen data.

Moreover, information data on the SIM card mounted on each of the sender's user terminal 100 and the receiver's user terminal 200 may be previously stored in the screen sharing server 10 to allow the sender's user terminal 100 and the receiver's user terminal 200 with the respective SIM cards, the information data of which are stored in the screen sharing server 10 to share screen data. In this case, the receiver's user terminal 200 transmits a connection request together with the information data on the SIM card mounted on the receiver's user terminal 200 itself to the screen sharing server 10. The screen sharing server 10 compares the received information data on the SIM card with the information data on the SIM card that is stored in the screen sharing server 10 itself. If the information data are the same as each other, the screen sharing server 10 can allow the terminals to start to share screen data. If the information data on the SIM card are different from each other, the screen sharing server 10 should not allow the terminals to share screen data. The number of the SIM card stored in the screen sharing server 10 may be one or may be two or more.

Moreover, the respective MAC addresses of the sender's user terminal 100 and the receiver's user terminal 200 may be previously stored in the screen sharing server 10 to allow the sender's user terminal 100 and the receiver's user terminal 200 with the respective stored MAC addresses to share screen data. In this case, the receiver's user terminal 200 transmits a connection request together with its own MAC address to the screen sharing server 10. The screen sharing server 10 compares the received MAC address with the MAC address stored in the screen sharing server 10 itself. If the MAC addresses are the same as each other, the screen sharing server 10 can allow the terminals to start to share screen data. If the MAC addresses are different from each other, the screen sharing server 10 should not allow the terminals to share screen data. The number of the MAC address stored in the screen sharing server 10 may be one or may be two or more.

Moreover, the respective phone numbers of the sender's user terminal 100 and the receiver's user terminal 200 may be previously stored in the screen sharing server 10 to allow the sender's user terminal 100 and the receiver's user terminal 200 with the respective stored phone numbers to share screen data. In this case, the receiver's user terminal 200 transmits a connection request together with its own phone number to the screen sharing server 10. The screen sharing server 10 compares the received phone number with the phone number stored in the screen sharing server 10 itself. If the phone numbers are the same as each other, the screen sharing server 10 can allow the terminals to start to share screen data. If the phone numbers are different from each other, the screen sharing server 10 should not allow the terminals to share screen data. The number of the phone number stored in the screen sharing server 10 may be one or may be two or more. Moreover, the screen sharing server 10 may store a phone number by registering a phone number in an address book application. In this case, the screen sharing server 10 only has to compare a received phone number with a phone number registered in the application.

Moreover, the phone number of the receiver's user terminal 200 may be previously stored in the sender's user terminal 100 to allow the receiver's user terminal 200 with this phone number to share screen data with the sender's user terminal 100. In this case, the receiver's user terminal 200 transmits a connection request together with its own phone number to the screen sharing server 10. Then, the screen sharing server 10 may acquire a phone number stored in the sender's user terminal 100 and compare the phone number stored in the sender's user terminal 100 with the phone number received from a receiver's user terminal 200. If the phone numbers are the same as each other, the screen sharing server 10 can allow the terminals to start to share screen data. If the phone numbers are different from each other, the screen sharing server 10 should not allow the terminals to share screen data. The number of the phone number stored in the sender's user terminal 100 may be one or may be two or more. Moreover, the sender's user terminal 100 may store a phone number by registering a phone number in an address book application. In this case, the screen sharing server 10 only has to acquire a phone number registered in the application.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Screen sharing system
5 Public line network
10 Screen sharing server
100 Sender's user terminal
200 Receiver's user terminal

What is claimed is:
1. A screen sharing server allowing user terminals to share a screen, comprising:
 a communication device; and
 at least one processor that:
 receives, via the communication device, a connection request each from a sender's user terminal and a receiver's user terminal;

receives, via the communication device, an authentication number to specify the sender's user terminal with which a screen is to be shared, in response to the connection request;
allows, via the communication device, the receiver's user terminal to display a prompt to ask for an input of the authentication number;
authenticates the authentication number in response to receiving the authentication number from the receiver's user terminal;
receives, via the communication device, shared screen data from the sender's user terminal and sequentially transfers the shared screen data to the receiver's user terminal, when the authentication number is correct;
detects, via the communication device, that the sender's user terminal discontinues transmitting the screen data; and
makes, via the communication device, an inquiry about to the receiver's user terminal with an authenticated authentication number whether or not to transmit the shared screen data, in response to the detection.

2. The screen sharing server according to claim 1, wherein the at least one processor receives, via the communication device, the shared screen data from the receiver's user terminal with the authenticated authentication number in response to the inquiry and sequentially transfers, via the communication device, the shared screen data to a receiver's user terminal different from the receiver's user terminal at which the inquiry is made.

3. The screen sharing server according to claim 1, wherein the at least one processor judges whether or not a predetermined time has passed since the detection, and
wherein the at least one processor receives, via the communication device, the shared screen data from the receiver's user terminal with the authenticated authentication number when the predetermined time has passed, and sequentially transfers, via the communication device, the shared screen data to a receiver's user terminal different from the receiver's user terminal at which the inquiry is made.

4. The screen sharing server according to claim 1, wherein the inquiry includes a message for inquiring about whether the receiver's user terminal at which the inquiry is made will become a new sender in accordance with the discontinuation of the sender's user terminal.

5. A method of sharing a screen by allowing user terminals to share a screen, comprising the steps of:
receiving a connection request each from a sender's user terminal and a receiver's user terminal;
receiving an authentication number to specify the sender's user terminal with which a screen is to be shared, in response to the connection request;
allowing the receiver's user terminal to display a prompt to ask for an input of the authentication number;
authenticating the authentication number in response to receiving the authentication number from the receiver's user terminal;
receiving shared screen data from the sender's user terminal and sequentially transferring the shared screen data to the receiver's user terminal, when the authentication number is correct;
detecting that the sender's user terminal discontinues transmitting the screen data; and
making an inquiry to the receiver's user terminal with an authenticated authentication number about whether or not to transmit the shared screen data, in response to the detection.

6. The method according to claim 5, wherein the inquiry includes a message for inquiring about whether the receiver's user terminal at which the inquiry is made will become a new sender in accordance with the discontinuation of the sender's user terminal.

7. The method according to claim 5, further comprising receiving the shared screen data from the receiver's user terminal with the authenticated authentication number in response to the inquiry and sequentially transferring the shared screen data to a receiver's user terminal different from the receiver's user terminal at which the inquiry is made.

8. The method according to claim 5, further comprising:
judging whether or not a predetermined time has passed since the detection; and
receiving the shared screen data from the receiver's user terminal with the authenticated authentication number when judging that the predetermined time has passed and sequentially transferring the shared screen data to a receiver's user terminal different from the receiver's user terminal at which the inquiry is made.

9. A computer program product for use in a screen sharing server allowing user terminals to share a screen, comprising a non-transitory computer usable medium having a set of instructions physically embodied therein, the set of instructions including computer readable program code, which when executed by the screen sharing server causes a processor to:
receive a connection request each from a sender's user terminal and a receiver's user terminal;
receive an authentication number to specify the sender's user terminal with which a screen is to be shared, in response to the connection request;
allow the receiver's user terminal to display a prompt to ask for an input of the authentication number;
authenticate the authentication number in response to receiving the authentication number from the receiver's user terminal;
receive shared screen data from the sender's user terminal and sequentially transferring the shared screen data to the receiver's user terminal, when the authentication number is correct;
detect that the sender's user terminal discontinues transmitting the screen data; and
make an inquiry to the receiver's user terminal with the authenticated authentication number about whether or not to transmit the shared screen data, in response to the detection.

10. The computer program product according to claim 9, wherein the inquiry includes a message for inquiring about whether the receiver's user terminal at which the inquiry is made will become a new sender in accordance with the discontinuation of the sender's user terminal.

11. The computer program product according to claim 9, wherein the set of instructions including computer readable program code causes the information processing unit further to receive the shared screen data from the receiver's user terminal with the authenticated authentication number in response to the inquiry and sequentially transfer the shared screen data to a receiver's user terminal different from the receiver's user terminal at which the inquiry is made.

12. The computer program product according to claim 9, wherein the set of instructions including computer readable program code causes the information processing unit further to:
judge whether or not a predetermined time has passed since the detection; and receive the shared screen data from the receiver's user terminal with the authenticated authentication number when judging that the predetermined time has passed and sequentially transfer the shared screen data to a receiver's user terminal different from the receiver's user terminal at which the inquiry is made.

\* \* \* \* \*